(12) United States Patent
Leach et al.

(10) Patent No.: US 6,551,539 B1
(45) Date of Patent: Apr. 22, 2003

(54) RELEASABLE STRAP

(75) Inventors: Peter Leach, Hooksett, NH (US); Michael Carbonneau, Bedford, NH (US); Matthew Raimer, Goffstown, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 09/664,663

(22) Filed: Sep. 19, 2000

(51) Int. Cl.$^7$ ................................ B29C 47/06
(52) U.S. Cl. ............. 264/151; 156/244.15; 156/244.19; 264/157; 264/171.13
(58) Field of Search ................. 156/244.19, 244.18, 156/244.15; 264/151, 157, 167, 171.13, 210.2; 24/307, 450, 452

(56) References Cited

U.S. PATENT DOCUMENTS

| | | |
|---|---|---|
| 165,407 A | 7/1875 | Dawson |
| 427,355 A | 5/1890 | McLaren, Jr. |
| 487,145 A | 11/1892 | Gibbons |
| 1,945,932 A | 2/1934 | Caley |
| 3,197,830 A | 8/1965 | Hoadley |
| 3,261,100 A | 7/1966 | Quenot |

(List continued on next page.)

FOREIGN PATENT DOCUMENTS

| | | |
|---|---|---|
| EP | 0 379 850 | 8/1990 |
| EP | 0 826 354 | 3/1998 |
| EP | 1 066 770 | 1/2001 |
| GB | 1196366 | 6/1970 |
| WO | WO 00/27235 | 5/2000 |
| WO | WO 0050208 | 8/2000 |

* cited by examiner

Primary Examiner—Mark Eashoo

(74) Attorney, Agent, or Firm—Fish & Richardson P.C.

(57) ABSTRACT

Methods of forming a releasable strap of hook and loop material and resulting products are shown. The strap has a hook side and a loop side, the hooks being formed of synthetic resin on a mold roll defining a multiplicity of hook mold cavities. A method is shown comprising providing a mold roll having at least one relatively wide hook molding region over which hook mold cavities are distributed and, preferably at least at one side, a relatively narrow region devoid of hooks, and utilizing the mold roll to form a continuous sheet of material having on one side a wide band of loop-engageable hooks and preferably an adjacent relatively narrow band devoid of hooks, providing loops on the opposite side of the material, and repeatedly cutting the material at a substantial angle to the machine direction. The cuts preferably extend across wide and narrow bands, to define a series of constant pre-selected length having hook-engageable loops on one side and, on the other side, a main length portion covered with hooks and preferably at least one end portion devoid of hooks, preferably this end region stiffened by resin integral with the resin that forms the hooks. Other features shown are narrow resin-stiffened regions devoid of hooks on both sides of the hook-molding region of the mold roll, end portions of the strap devoid of hooks sized to enable grasping to pull the strap to peel the hooks from engagement with the loops, end portions of the hooks having surface portions suitable for grasping or for being written upon. The straps are preferably cut by a rotary cutter having cutting elements that form cuts or partial cuts or perforations at a substantial angle to the machine direction, e.g., cutter elements blades helically arranged to form cuts at an acute angle to the machine direction, to produce strap ends that taper to points and cutter elements arranged parallel to the axis of the rotary cutter, at a right angle to the machine direction, to produce strap end portions that are square. A mold roll is shown having at least two relatively wide hook molding regions over which hook mold cavities are distributed, and a cut is located between the molding regions to form a plurality of end-to-end straps, extending at an angle to the machine direction. Advantageous further features are shown of the process, the product and the machine used.

17 Claims, 6 Drawing Sheets

U.S. PATENT DOCUMENTS

| | | |
|---|---|---|
| 3,279,008 A | 10/1966 | Wallach |
| 3,426,363 A | 2/1969 | Girard |
| 3,594,865 A | 7/1971 | Erb .............................. 18/5 |
| 3,780,921 A | 12/1973 | Harp |
| 3,973,610 A | 8/1976 | Ballin |
| 4,273,130 A | 6/1981 | Simpson |
| 4,477,950 A | 10/1984 | Cisek et al. |
| 4,794,028 A | 12/1988 | Fischer |
| 4,893,381 A | 1/1990 | Frankel |
| 4,896,402 A | 1/1990 | Jansen et al. |
| 4,939,818 A | 7/1990 | Hahn |
| 4,942,644 A | 7/1990 | Rowley |
| 5,048,158 A | 9/1991 | Koerner |
| 5,133,671 A | 7/1992 | Boghosian |
| 5,189,761 A | 3/1993 | Chisholm |
| 5,260,015 A | 11/1993 | Kennedy et al. |
| 5,312,387 A | 5/1994 | Rossini et al. |
| 5,441,687 A * | 8/1995 | Murasaki et al. ............ 264/167 |
| 5,512,234 A * | 4/1996 | Takizawa et al. ...... 156/244.18 |
| 5,603,708 A | 2/1997 | Seth |
| 5,669,120 A * | 9/1997 | Wessels et al. ................ 24/445 |
| 5,759,317 A | 6/1998 | Justmann |
| 5,802,676 A | 9/1998 | Tolan |
| 5,851,467 A * | 12/1998 | Murasaki ............... 156/244.15 |
| 5,870,849 A | 2/1999 | Colson, Jr. |
| 5,948,337 A * | 9/1999 | Sakakibara et al. ......... 264/167 |
| 5,951,931 A * | 9/1999 | Murasaki et al. .............. 24/452 |
| 5,997,522 A | 12/1999 | Provost et al. |
| 6,044,525 A | 4/2000 | Sastre et al. |
| 6,060,009 A * | 5/2000 | Welygan et al. ........ 156/244.11 |

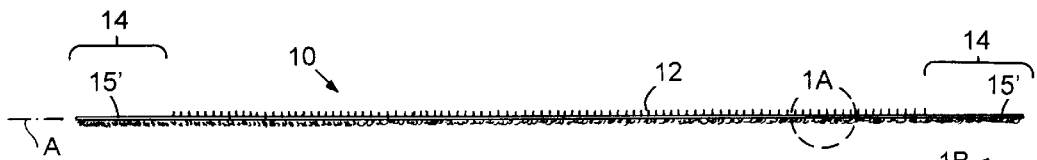
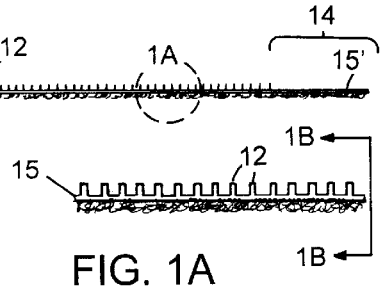
FIG. 1    FIG. 1A
FIG. 1B
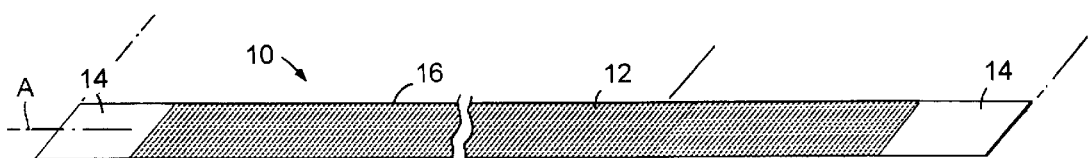
FIG. 2
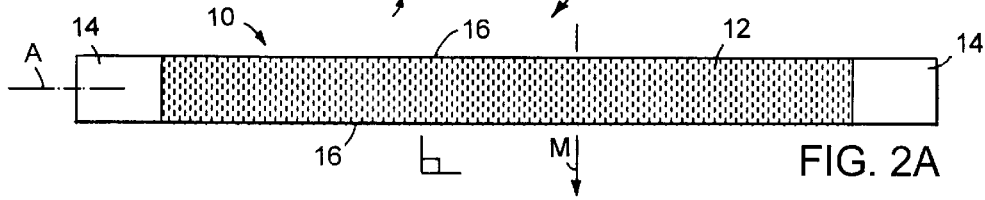
FIG. 2A
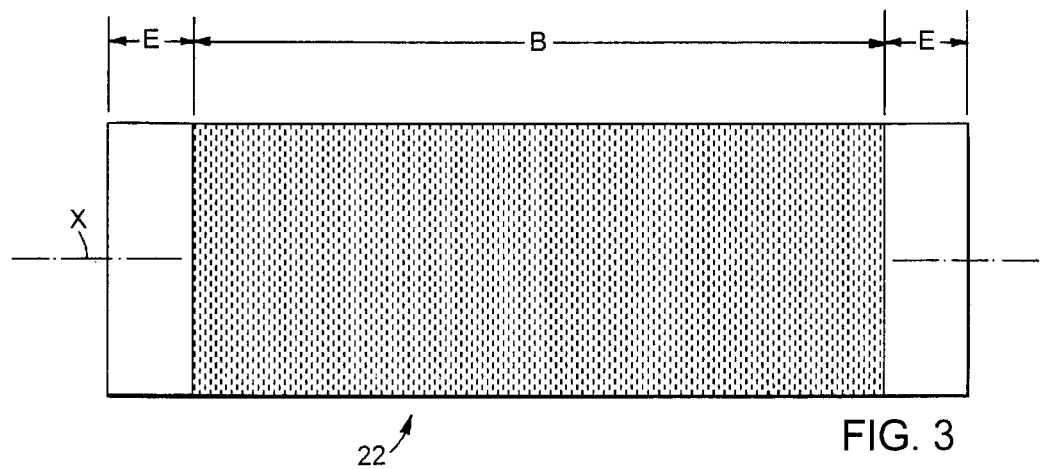
FIG. 3

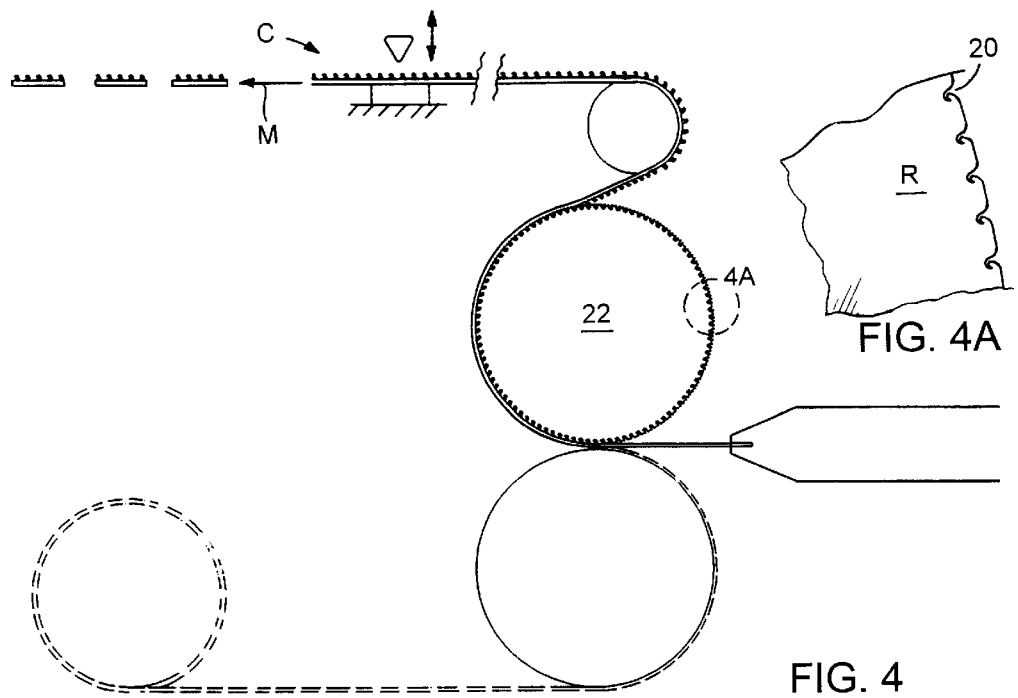
FIG. 4
FIG. 4A
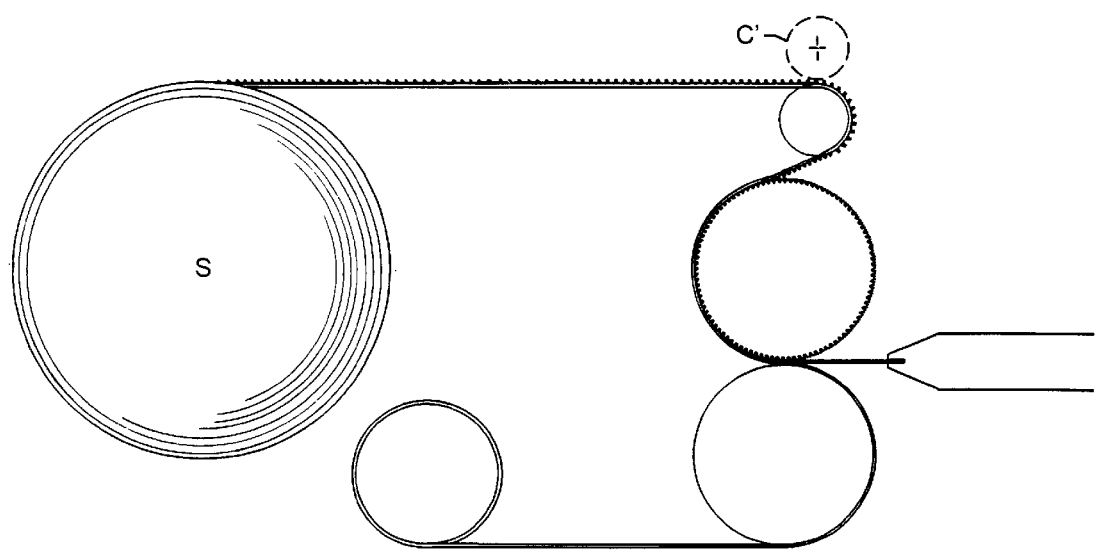
FIG. 5

RELEASABLE STRAP

TECHNICAL FIELD

This invention relates to releasable straps. One use of a releasable strap is the temporary tying together of loose components of an automobile wiring harness after manufacture, for delivery from the manufacturer to a remote automotive assembly plant. At the assembly plant the strap is removed by an assembly line worker as the wiring harness is installed.

BACKGROUND

A desirable strap for such temporary bundling of wiring harnesses and other materials is a so-called hook and loop strap, which has a field of loop-engageable hooks extending along one side of the strap and a field of hook-engageable loops on the other side. Typically the entire surface of the sides of the strap comprise hook and loop materials, respectively. The hook and loop materials are designed to be aggressive to assure that the wiring harness bundle or other materials remain undisturbed during handling.

The complementary fastener hooks and loops permit releasable hook-and-loop fastening when the strap is wrapped e.g., about the wire harness and over itself so that a region of hooks on the inside surface of the strap engage with loops on the strap's outside surface. A worker in an automotive assembly line can then grasp the end of the aggressive strap and peel the engaged strap portions apart to release the wiring assembly. Because the worker typically wears gloves, it has been common to apply a masking material to the end of the strap on the hook-side to provide a plain end to the strap, i.e., an end that has no hooks available to engage the loops. This end portion then stays free of the loops and provides a portion to be grasped and pulled to peel the fastener components apart to, release the strap.

Typically, such strap products have been formed by applying continuous lengths of loop material to continuous lengths of hook material. The continuous laminated material has then been cut longitudinally (in the machine direction) into continuous strips of suitable width. These strips have then been cut to the desired length. An excellent way of forming the base hook and loop material has been by the process shown in Kennedy et al. U.S. Pat. No. 5,260,015, in which, during molding of the hooks on a rotary mold, a pre-formed loop fabric is laminated to the side of the base layer opposite that from which the hooks extend, while the hook material is on the mold roll, so-called "in situ" lamination.

SUMMARY OF THE INVENTION

According to one aspect of the invention, a method is provided of forming a releasable strap of hook and loop material, the strap having a hook side and a loop side, the hooks being formed of synthetic resin on a mold roll that has a multiplicity of hook mold cavities. According to this aspect of the invention, the mold roll has at least one relatively wide-hook molding region, and has, at least at one side of the hook-molding region, a relatively narrow region devoid of hooks. Using this machine, a continuous sheet material is produced having, in the machine direction, on one side a wide band of loop-engageable hooks and an adjacent relatively narrow band devoid of the hooks, while hook-engageable loops are on the opposite side of the material.

The method further involves repeatedly cutting the continuous material at a substantial angle to the machine direction, the cuts extending across the wide and narrow bands to define a series of straps of constant pre-selected length, each strap being characterized by having fastener loops on one side and on the other side a main length portion covered with fastener hooks and at least one end portion devoid of hooks.

The invention also features a method of forming a releasable strap of hook and loop material, the strap having a hook side and a loop side, the hooks being formed of synthetic resin on a mold roll defining a multiplicity of hook mold cavities, the method comprising providing a mold roll having at least one relatively wide hook molding region over which hook mold cavities are distributed and, at least at one side thereof, a relatively narrow region devoid of hooks, and exposing both regions to plastic resin and utilizing the mold roll to form a continuous sheet of material having on one side a wide band of loop-engageable hooks and an adjacent relatively narrow band of resin devoid of hooks, while hook-engageable loops are on the opposite side of the material, and repeatedly cutting the material at a substantial angle to the machine direction, the cuts extending across the wide and narrow bands, to define a series of straps of constant pre-selected length having hook-engageable loops on one side and, on the other side, a main length portion covered with hooks and at least one end portion that is devoid of hooks and stiffened by resin.

In another aspect of the invention, the above methods are performed omitting the portion of the mold roll devoid of hooks, to produce straps by cross-wise or angled cuts.

Preferred embodiments of the invention have one or more of the following features.

On the mold roll there are relatively narrow regions devoid of hooks on both sides of the relatively wide hook mold region, and the method provides straps having on the hook side, end portions at both ends of the strap that are devoid of hooks, and which, in many instances, are preferably stiffened by the resin.

Preferably, for use for instance in securing automotive harnesses, the end portions devoid of hooks are sized to enable grasping by a gloved worker to exert pull on the strap to peel the hooks from their engagement with the loops that they overlap.

Advantageously, a rotary cutter can be employed having parallel cutting elements that are spaced apart by the desired width of the straps, to form cuts or perforations in the continuous length of material.

In one preferred case, the elements of the rotary cutter are helically arranged to make the cuts or perforations in lines at a substantial acute angle to the machine direction, and the resulting straps taper to points at their ends. In another case the cuts or perforations are made in lines at a right angle to the machine direction, resulting in straps having square ends.

Advantageously, the methods are conducted in such manner that the cutting is controlled to partially sever or partially perforate the straps to form lines of substantial weakening, but leaving the straps connected sufficiently to enable the overall material to be rolled into the form of a supply roll from which individual straps or groups of straps can be detached by breaking away at selected lines of weakening. In one preferred embodiment, the straps are approximately 19 inches in length. Portions having plain surfaces are preferably approximately 1 inch in length each.

Preferably, the strap material is formed by employing an extruder that introduces molten resin to the molding roll and the loop material is applied either simultaneously or immediately following the formation of a continuous hook strip, while the hook resin remains on the roll. Preferably methods as shown in Kennedy et al., U.S. Pat. No. 5,260, 015 or its variation, Murasaki et al., U.S. Pat. No. 5,441,687, are employed for in situ lamination of the loop material. These references are hereby incorporated by reference.

In one case the mold roll is utilized by forming a nip between the mold roll and a pressure roll, and introducing, to the nip, a sheet of molten resin from an extruder, while, preferably, preformed continuous sheet material defining the loops is introduced into the nip along with the resin in the manner that the sheet material is laminated in situ to a base layer of the resin while hooks are formed integrally by the mold roll on the other side of the resin.

In another case, a nozzle is shaped to define a mold region at a portion of the periphery of the mold roll and resin is introduced via the nozzle to the mold region from an extruder, while, preferably, preformed continuous sheet material defining the loops is introduced to the resin following the nozzle while the resin remains in the roll in the manner that it is laminated in situ to a base layer of the resin, the hooks on the other side of the material remaining in their mold cavities during this in situ lamination.

The mold roll comprises a series of mold-defining disks stacked together to define circumferentially arranged rows of hook molds.

Regions of the mold roll devoid of hooks are each defined by at least one cylindrical section having a smooth periphery.

The region of the mold roll devoid of hooks is defined by a set of disks having smooth peripheral surfaces, which are stacked together to effectively define the cylindrical section.

In another aspect, the invention comprises a releasable elongated strap of hook and loop material, the strap having an axis of elongation, the strap having a hook side and a loop side, the hooks being formed of synthetic resin, the hooks being formed in rows extending in a given direction (termed the machine direction) on the strap, the given direction of the rows of hooks extending at a substantial angle to the axis of elongation of the strap, the straps having hook-engageable loops on one side and, on the other side, a main length portion covered with hooks and preferably at least one, preferably resin-stiffened, end portion devoid of hooks.

Preferred embodiments of this aspect of the invention have one or more of the following features.

The elongated strap has both end portions devoid of hooks.

The elongated strap has, on its hook side, a region devoid of hooks defined by synthetic resin having a molded matte surface suitable for receiving hand writing as by pen, crayon or marker.

The end portion or portions of the strap devoid of hooks are sized to enable grasping by a gloved worker to pull the strap, to peel the hooks from engagement with the loops.

The given machine direction lies diagonally, at a substantial acute angle to the direction of elongation of the strap and the end portions of the strap taper to points.

The given direction lies perpendicular to the direction of elongation of the strap and the end portions of the strap are square.

A multiplicity of straps are defined by partial cuts or perforations of a sheet of the material, remaining portions maintaining the integrity of the sheet while enabling a user to readily tear a strap from the remaining sheet, preferably a supply roll being defined by the joined straps.

The details of presently preferred embodiments of the invention are set forth in the accompanying drawings and the description below. Other features, objects, and advantages of the invention will be apparent from the description and drawings, and from the claims.

DESCRIPTION OF DRAWINGS

FIG. 1 is a side view of an embodiment of the product of the invention, while FIG. 1A is a greatly enlarged portion of FIG. 1 and FIG. 1B is a view taken on line 1B—1B of FIG. 1A;

FIGS. 2 and 3 are plan views of two different straps produced according to the invention;

FIG. 3 is a side view of a mold roll used in a preferred embodiment of the method of the invention;

FIGS. 4 and 5 are side views of two embodiments of machines for making straps of the invention which FIG. 4A is a magnified view of a designated portion of FIG. 4;

FIG. 6 is a plan view of portions of the machine of FIG. 4, while

DETAILED DESCRIPTION

Figure 6:
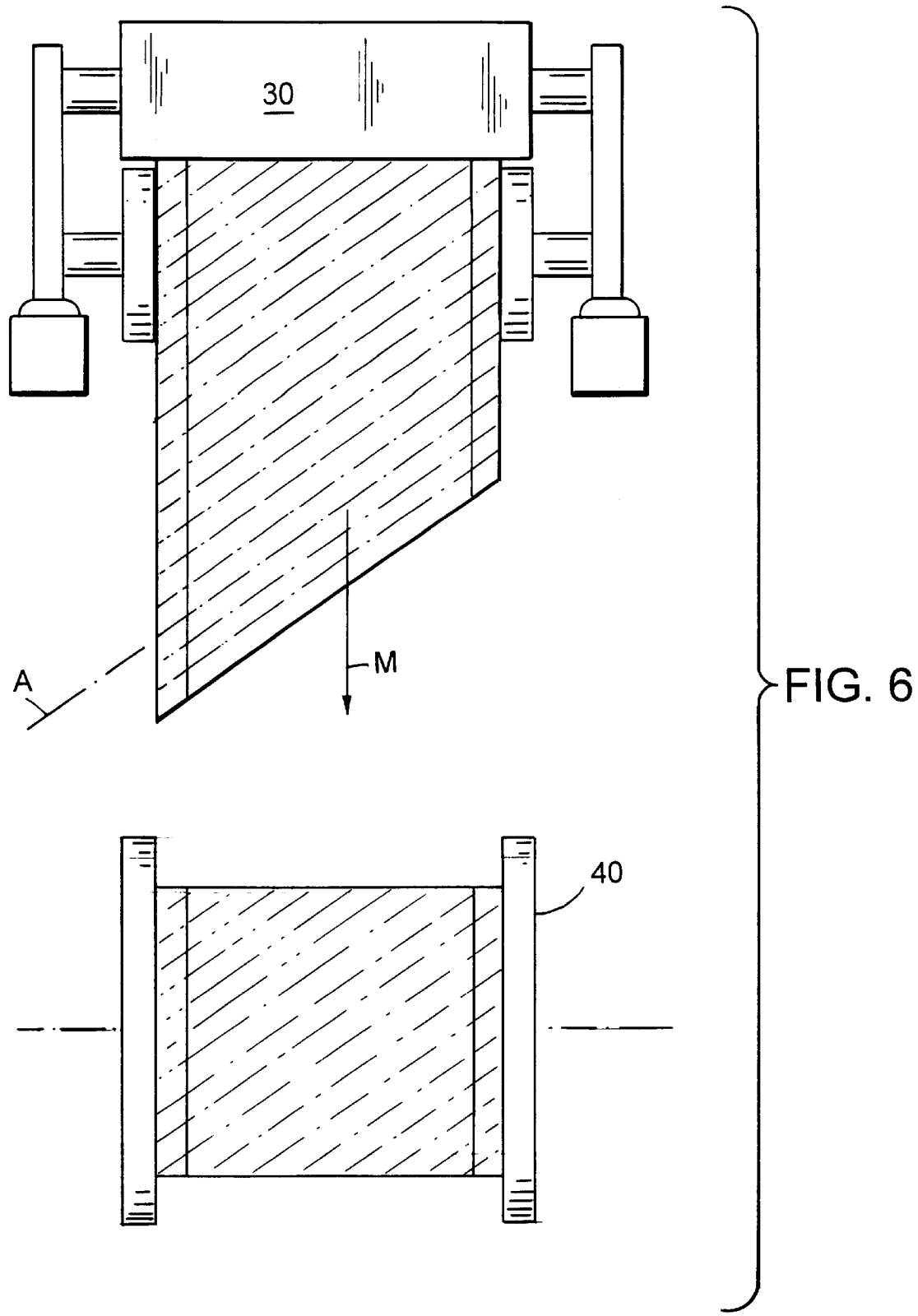

FIG. 1 shows a strap 10 having a field of hooks 12 and plain end portions 14 that in this preferred form are resin-stiffened by a continuation $15^1$ of the base layer 15 of the resin from which the hooks 12 extend. The strap has an axis A of elongation. With reference also to the plan view of FIG. 2, it is seen that the strap has pointed resin-stiffened ends and has edges 16 and axis A that lie at an acute angle a to the machine direction M. In FIG. 2A a similar strap is shown having resin-stiffened square ends while edges 16 and axis A lie perpendicular to the machine direction M.

FIG. 3 shows a cylindrical mold roll, rotatable about axis A, which is suitable for forming the straps of FIGS. 1, 2 and 2A, the mold roll surface has a band B of major width that has a distribution of mold cavities 20 (see FIG. 4A) and end regions E of the roll surface that are plain. The roll is formed of a series of disks or mold rings R that are stacked together along axis A. In the regions where it is desired to form hooks, the periphery of mold disks are provided with mold cavities 20, sided on each side with smooth periphery spacer discs that form the sides of the molds. In the regions E devoid of hook cavities, the peripheries of the rings may all be smooth, or may define dimples, projections, texture or ridges that facilitate grasping by hand, or provide a matte writing surface for marking.

FIG. 4 illustrates a machine and process for forming the hook portion of the strap of FIGS. 1, 2 and 2A employing roll 22 of FIG. 3. In some cases the hook material is removed from the mold roll and is later laminated on its backside to a loop material. However, preferably, as shown in dotted lines, a pre-formed loop material is introduced to the machine at the same time as the molten resin and the strap material, according to the process described generally in Kennedy et al., U.S. Pat. No. 5,260,015. In an alternative form, a strap is formed using the mold roll by the variant of the Kennedy technique, which is shown generally in Murasaki et al., U.S. Pat. No. 5,441,687. In each case, in situ lamination occurs under pressure while the heated resin is on the mold roll, taking advantage of the encapsulating and adhesive properties of the resin, and protection of the hooks by their being in their mold cavities at the time of application of lamination pressure.

Preferably, using these in situ techniques, the die of the extruder produces a supply of hook-forming resin that covers both bands B (of hook) and band E (devoid of hooks), and during the process the resin encapsulates the fibers on the facing side of the loop material over both bands, forming a permanent union by encapsulating or adhering to the fibers. The resin $15^1$ in region E is integral with the resin that forms the base layer 15 of the hook portion. The resin layer in region E may be finished with a shiny surface or a surface, which has hand-graspable protrusions or texture suitable for grasping or writing, and in either case serves to stiffen the end portion of the strap making it easy to grasp during quick hand actions of an assembly line worker, for instance.

In embodiments in which stiffening of the end portion is not desired, the supply of plastic is limited essentially to the band or bands B, while the loop fabric being laminated in situ is wider, to cover both bands B and E.

In a preferred embodiment for use with automotive harnesses the loop material is a strong hook-engageable material such as a knit loop nylon material available from Velcro USA, Inc., of Manchester, N.H. The hook material is also strong, employing, e.g., hook style CFM 15 of polyethylene, available from Velcro, USA Inc.

As suggested in FIG. 4, at a later stage the laminated material may be cut at cutter C into individual straps, at cut lines lying at an angle to the machine direction.

As shown in FIG. 5, preferably, following formation, the wide material is rolled into a roll. In a particularly preferred embodiment a rotary cutter $C^1$ makes partial angular cuts or perforations across the web while the product is still on the roll stack, before being formed into supply rolls.

According to another embodiment, FIG. 6, a roll of uncut material is subsequently unrolled and passed through a rotary die station 30 in which the material is perforated or partially cut with helical parallel blades or perforating elements along diagonal lines as shown to provide lines of weakening that define the straps, the resultant straps having pointed ends of hook-free material. The material is then re-rolled into a supply roll 40 consisting of the partially severed straps, see FIG. 6B. In a preferred case the diagonal cuts or perforation lines form an angle of about 45° to the machine direction M.

Figure 6A:
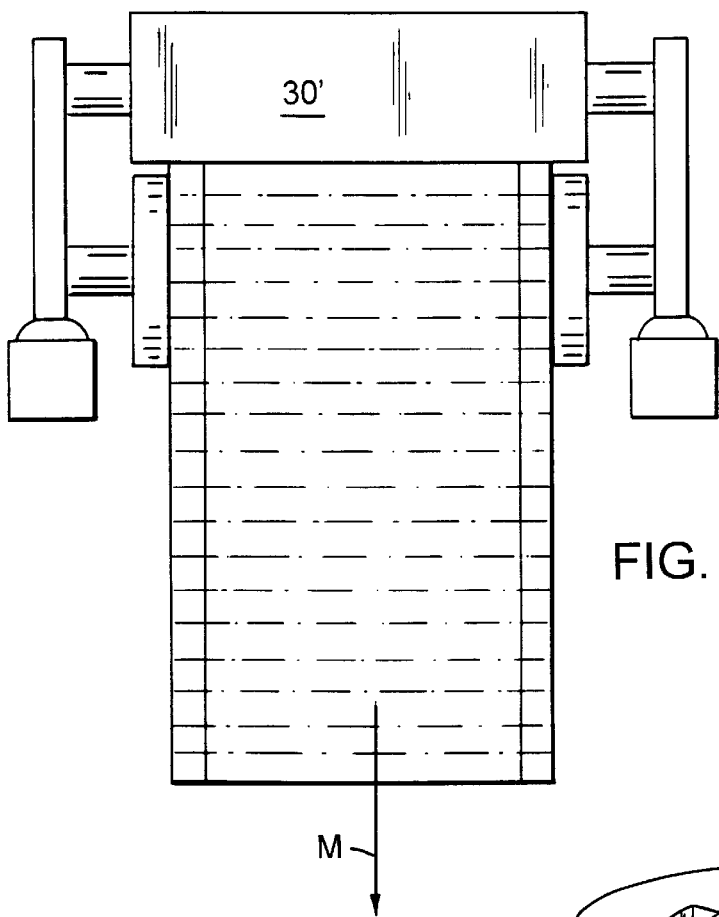
FIG. 6A is a plan view of a modification of the machine of FIG. 6.
Figure 6B:
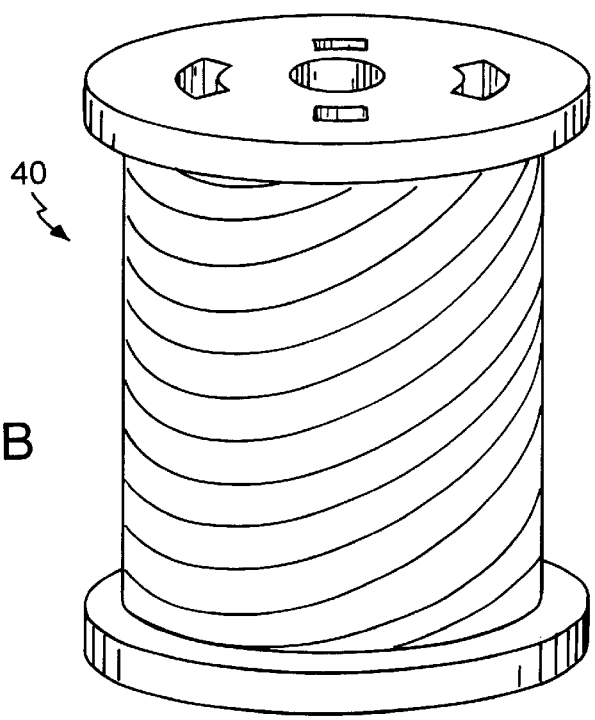
FIG. 6B is a perspective view of a roll of straps formed with the machine of FIG. 6.

In another embodiment, illustrated in FIG. 6A, at the rotary die station $30^1$, the material is perforated or partially cut with blades or perforating elements that are parallel to the axis of the rotary cutter, along lines perpendicular to the machine direction M. The resultant straps have square ends of hook-free material.

Figure 7:
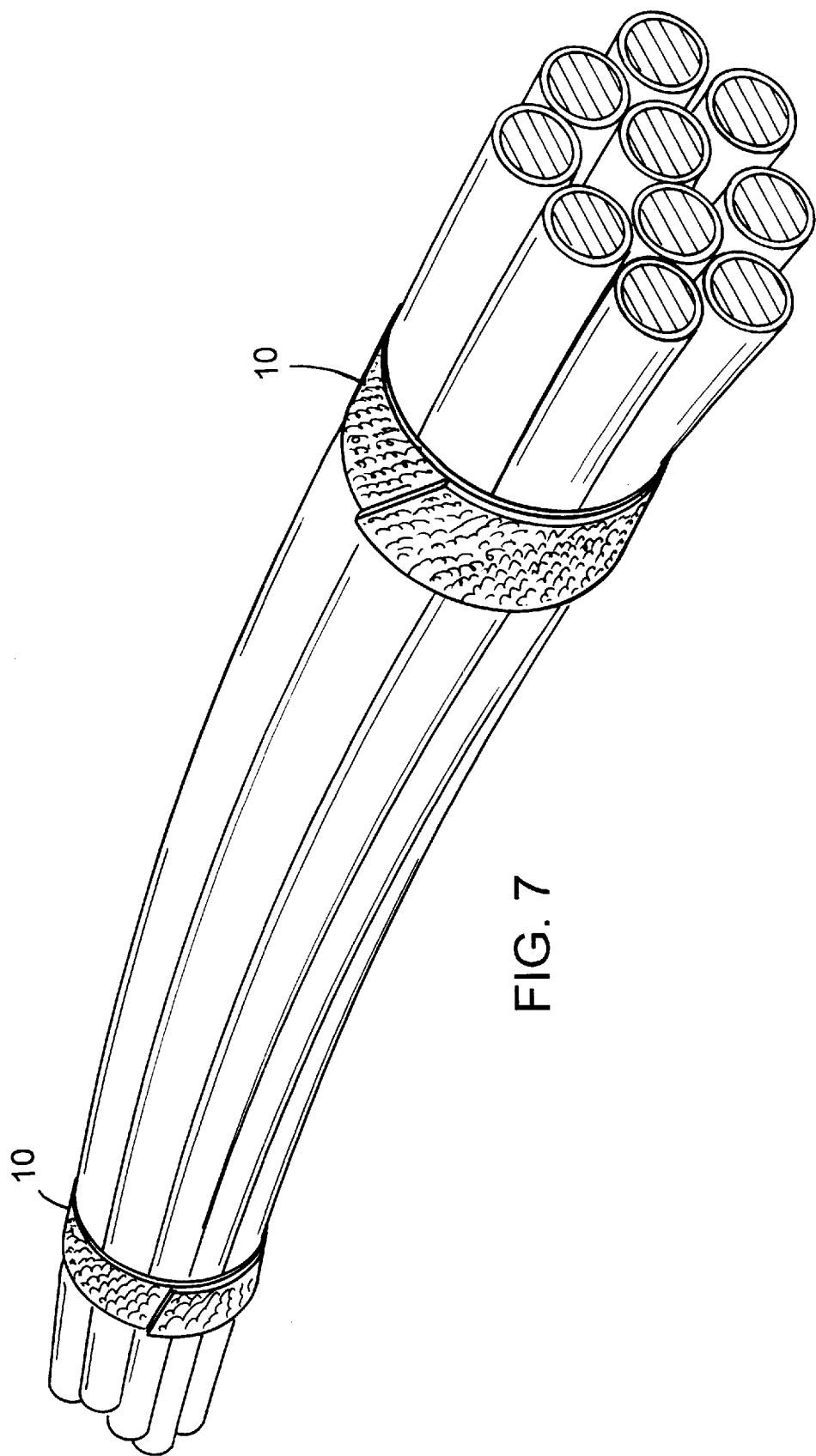
FIG. 7 illustrates cables bundled together by straps according to the invention and FIG. 8 illustrates a worker releasing a strap of FIG. 7.

FIG. 7 illustrates the formation of a cable harness employing a strap 10 detached from the supply roll 40 and wrapped around a cable assembly so that an end portion devoid of hooks and an adjacent region having hooks overlaps the back of the strap that carries loops.

Figure 8:
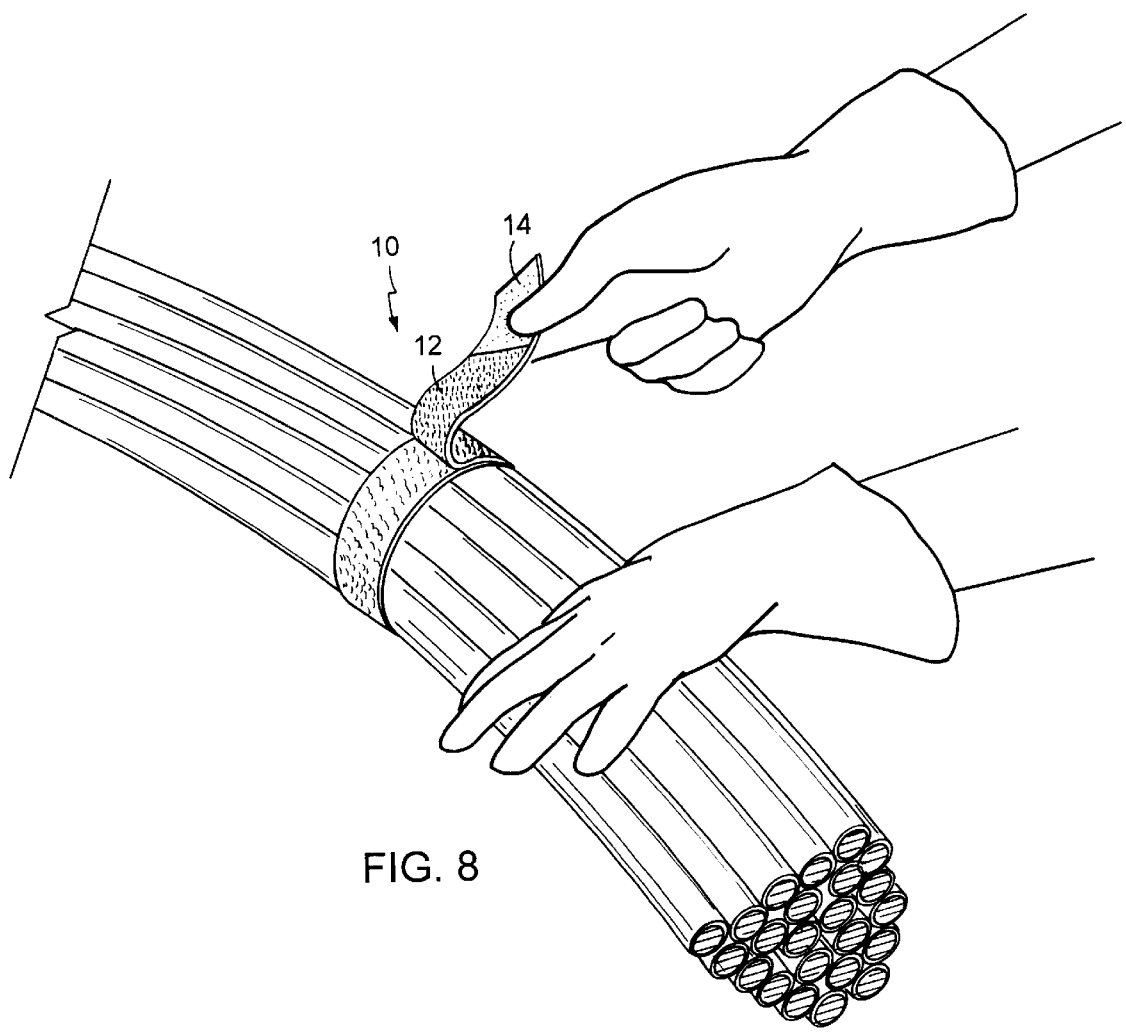

FIG. 8 illustrates an automobile assembly worker detaching the strap of FIG. 7 at an assembly plant remote from the location of the original manufacture of the cable harness. It is seen that the worker has gloved hands. The plain, resin-stiffened ends of the straps do not adhere to the loop surface of the strap, and stand free, readily available to be grasped by the worker and peeled away with little loss of time. The hand-graspable roughness-providing protrusions P or texture suggested by the stripping in FIG. 8 facilitates this action.

Preferred embodiments of the present invention have been described. Nevertheless, it will be understood that various modifications may be made without departing from the spirit and scope of the invention. Accordingly, other embodiments are within the scope of the following claims.

What is claimed is:

1. A method of forming a releasable strap of hook and loop material, the strap having a hook side and a loop side, the hooks being formed of synthetic resin on a mold roll defining a multiplicity of hook mold cavities, the method comprising providing a mold roll having at least one relatively wide hook molding region over which hook mold cavities are distributed;

utilizing the mold roll to form a continuous sheet of material having on one side a wide band of loop-engageable hooks, while loops are on the opposite side of the material; and repeatedly cutting the material at an angle to the machine direction to form cuts extending across said wide band, the cuts defining adjacent side edges of elongated straps having hook-engageable loops on one side and, on the other side, a main length portion covered with hooks.

2. A method of forming a releasable strap of hook and loop material, the strap having a hook side and a loop side, the hooks being formed of synthetic resin on a mold roll defining a multiplicity of hook mold cavities, the method comprising providing a mold roll having at least one relatively wide hook molding region over which hook mold cavities are distributed and, at least at one side of the hook molding region, a relatively narrow region devoid of hooks;

utilizing the mold roll to form a continuous sheet of material having on one side a wide band of loop-engageable hooks and an adjacent relatively narrow band devoid of hooks, while loops are on the opposite side of the material; and repeatedly cutting the material at an angle to the machine direction to form cuts extending across said wide and narrow bands, the cuts defining adjacent side edges of elongated straps having hook-engageable loops on one side and, on the other side, a main length portion covered with hooks and at least one end portion devoid of hooks.

3. A method of forming a releasable strap of hook and loop material, the strap having a hook side and a loop side, the hooks being formed of synthetic resin on a mold roll defining a multiplicity of hook mold cavities, the method comprising providing a mold roll having at least one relatively wide hook molding region over which hook mold cavities are distributed and, at least at one side of the hook molding region, a relatively narrow region devoid of hooks, exposing both regions to plastic resin;

utilizing the mold roll to form a continuous sheet of material having on one side a wide band of loop-engageable hooks and an adjacent relatively narrow band devoid of hooks extending substantially parallel to the machine direction, while loops are on the opposite side of the material; and repeatedly cutting the material at an angle to the machine direction, to form cuts extending across said wide and narrow bands, the cuts defining adjacent side edges of elongated straps having hook-engageable loops on one side and, on the other side, a main length portion covered with hooks and at least one end portion devoid of hooks and stiffened by resin.

4. The method of claims 1, 2 or 3 in which the straps are cut by a rotary cutter having elements arranged to form cuts or perforations at a substantial angle to the machine direction.

5. The method of claim 4, in which the elements are helically arranged on the rotary cutter to form diagonal cuts or perforations in lines at a substantial acute angle to the machine direction, to produce strap end portions that taper to points.

6. The method of claim 4, in which the elements are arranged in lines parallel to the axis of the rotary cutter and at a right angle to the machine direction, to produce strap end portions that are square.

7. The method of claims 1, 2 or 3 in which the mold roll has at least two of said relatively wide hook molding regions over which hook mold cavities are distributed, including the step of making a cut located between said molding regions to form a plurality of end-to-end straps, which extend at said substantial angle to the machine direction.

8. The method of claims 1, 2 or 3 in which the cutting is controlled to partially sever or perforate the straps to form lines of weakening, leaving adjacent straps connected to each other sufficiently to enable the material to be rolled into the form of a supply roll from which individual straps or groups of straps can be detached by breaking away at selected lines of weakening.

9. The method of claims 1, 2 or 3 in which the mold roll provided comprises a series of mold-defining disks stacked together to define circumferentially arranged rows of hook molds.

10. The method of claims 1, 2 or 3 in which the mold roll is utilized by forming a nip between the mold roll and a pressure roll, and introducing, to the nip, molten resin from an extruder.

11. The method of claim 10 in which preformed continuous sheet material defining said loops is introduced into the nip along with the resin in the manner that the sheet material is laminated in situ to a base layer of said resin while hooks are formed integrally by the mold roll on the other side of the resin.

12. The method of claims 1, 2 or 3 in which a nozzle is shaped to define a mold region at a portion of the periphery of the mold roll and introducing to the mold region molten resin from an extruder.

13. The method of claim 12 in which preformed continuous sheet material defining said loops is introduced to the resin following the nozzle while the resin remains or the roll in the manner that the sheet material is laminated in situ to a base layer of said resin while hooks on the other side of the roll remain in their mold cavities.

14. The method of claim 2 or 3 in which there are relatively narrow regions devoid of hooks on both sides of the hook-molding region of the mold roll, and the method is so conducted that it provides straps having end portions devoid of hooks on both ends of the strap.

15. The method of claim 2 or 3 in which the end portion of the strap devoid of hooks is sized to enable grasping to pull the strap to peel the hooks from engagement with the loops.

16. The method of claim 2 or 3 in which the region of the mold roll devoid of hooks is defined by at least one cylindrical section having a selected surface.

17. The method of claim 16 in which the region of the mold roll devoid of hooks is defined by a set of disks which are stacked together to effectively define said cylindrical section.

* * * * *